United States Patent [19]

Fink

[11] Patent Number: 4,938,225

[45] Date of Patent: Jul. 3, 1990

[54] ULTRASONIC ECHOGRAPH UTILIZING AT LEAST ONE PIEZOELECTRIC TRANSDUCER WITH AN ASSOCIATED RANDOM PHASE SCREEN, AND METHOD OF SCANNING AN OBJECT BY MEANS OF SUCH AN ECHOGRAPH

[75] Inventor: Mathias A. Fink, Strasbourg, France

[73] Assignee: U.S. Philips Corporation, New York, N.Y.

[21] Appl. No.: 197,080

[22] Filed: May 20, 1988

[30] Foreign Application Priority Data

Jun. 4, 1987 [FR] France ................... 8707795

[51] Int. Cl.$^5$ ............................................. A61B 8/00
[52] U.S. Cl. ............................ 128/660.01; 73/596; 73/644
[58] Field of Search ......... 128/660.01, 660.06–661.01, 128/663.01; 73/596, 599, 602, 618–626, 644

[56] References Cited

U.S. PATENT DOCUMENTS 3,805,596 4/1974 Klahr ..................... 128/660.09
4,153,894 5/1979 Alphonse et al. ............... 73/644 X
4,452,083 6/1984 Brettel et al. ................ 73/644 X

OTHER PUBLICATIONS

Nagy, Peter B. et al., "Surface Roughness Induced Attenuation of Reflected and Transmitted Ultrasonic Waves," Jour. Acoustic Soc. Amer. 82(1) Jul. 1987.
Abbott, J. G. et al., "Multi-Scan Processing in a Phased Array Imaging System," 1978 IEEE UTS Symp. Proc., Cherry Hill, N.J. pp. 220–224.

Primary Examiner—Francis Jaworski
Attorney, Agent, or Firm—William Squire; Jack E. Haken

[57] ABSTRACT

The ultrasonic echograph comprises at least one piezoelectric transducer (10, 13) for the transmission and/or reception of an ultrasonic scanning beam (20). With at least one piezoelectric transducer (10) there is associated a random phase screen (11) which is arranged in the ultrasonic scanning beam (20) and which is displaceable with respect to the axis of this beam. Means are provided for the recording of an echographic line e(t) for each position ($\alpha$) of said random phase screen. The major technical effect of the presence of the random phase screen in the ultrasonic beam path is the disturbing of the coherence of the wave traversing the screen.

Applications can be found notably in medical ultrasonic echography and non-destructive testing of materials.

3 Claims, 5 Drawing Sheets

ULTRASONIC ECHOGRAPH UTILIZING AT LEAST ONE PIEZOELECTRIC TRANSDUCER WITH AN ASSOCIATED RANDOM PHASE SCREEN, AND METHOD OF SCANNING AN OBJECT BY MEANS OF SUCH AN ECHOGRAPH

The invention relates to an ultrasonic echograph, comprising at least one piezoelectric transducer for the transmission and/or reception of an ultrasonic scanning beam. The invention also relates to a method of scanning an object by ultrasonic echography using such an echograph.

The invention can be particularly attractively used in the medical field, more specifically for the imaging of organs and the characterization of the tissues of said organs, as well as in the field of non-destructive testing of diffusive materials. When solid materials are concerned, these are usually all materials having a granular or fibre structure, more specifically composite materials, comprising large grains of titanium. When soft materials are concerned, they are agricultural products such as dairy products, notably cheese, and meats.

In the medical field, the general technical problem to be solved by an ultrasonic echograph as described above usually consists in that on the one hand there must be obtained an exact as possible image of the object being scanned, both at regards its contours and its specular walls such as veins present therein, whilst on the other hand a reliable pathological study of the tissues of the same organ by exact measurement of their ultrasonic wave attenuation parameter, must be possible.

Similarly, in the field of nondestructive materials testing the technical problem consists on the one hand in the detection of irregularities, such as lamination fissures, in the echographic noise of the diffusive materials by distinguishing a delamination from a highly porous zone, whilst on the other hand it must be possible to perform any quantitative measurement important to the non-destructive testing by exact measurement of the ultrasonic wave attenuation parameter.

Various solutions to this general technical problem have already been proposed. Notably the article by M. Fink "Imagerie ultrasonore", published in Journal de Physique Appliquée 18 (1983) pp. 527-556, which exhaustively analyses all aspects of echographic imaging and French patent specification No. 2 514 910 (PHF 81.595) which concerns the measurement of the attenuation parameter can be cited in this respect All known prior art solutions have given drawbacks and given restrictions even though they often lead to satisfactory results.

First of all, the determination of the contours of organs, or the detection of faults in the materials and, more generally, the fixed specular walls, is disturbed, in relation to the coherent character of the ultrasonic wave transmitted by the piezoelectric transducer, by structural interference of the echoes produced by the multi-diffusers contained in the object being studied. In the acoustic field this parasitic phenomenon is analogous to that which is known as "speckle" in the optical field and which causes "light grains" which are often encountered in association with laser transmissions.

However, the measurement of the attenuation parameter, based on the analysis of echographic signals delivered by multi-diffusers which are distributed at random in the object being measured, necessitates the recording of a large number of echographic lines and spectra obtained on the basis of the echoes produced by the multi-diffusers contained in a comparatively large volume, so that the piezoelectric transducer must be displaced during the measurement, which displacement causes a substantial reduction of the spatial solution. Moreover, the presence of specular walls inside the object being scanned substantially influences the echoes from the multi-diffusers and, consequently, the determination of the desired attenuation parameter. Only an exact spatial localization of the specular reflectors would enable a reduction of their adverse effect on the analysis of the signals emitted by the multi-diffusers.

Another technical problem to be solved by the invention is to provide an ultrasonic echograph which comprises at least one piezoelectric transducer for the transmission and/or reception of an ultrasonic scanning beam and which offers an improved echographic image, without "speckles", of the objects scanned as well as an exact determination of the attenuation parameter without necessitating the displacement of the piezoelectric transducer, and hence without loss of spatial resolution.

This technical problem is solved in accordance with the invention in that with at least one piezoelectric transducer there is associated a random phase screen which is arranged in the ultrasonic scanning beam and which is displaceable with respect to the axis of this beam, there being provided means for recording an echographic line for each position of said random phase screen. "Displaceable with respect to the axis of the ultrasonic scanning beam" is to be understood to mean herein that it can be moved with respect to the ultrasonic beam under the influence of a relative translatory, rotary or rotary/translatory movement. The main technical effect of the presence of a random phase screen on the ultrasonic beam path consists in the disruption of the coherence of the wave traversing the screen.

In practice the random phase screen is formed by a plate of a material whose sound propagation speed differs from that of water and at least one surface of which has a random granular roughness. This material must have a sound propagation speed which differs from that of water in order to produce random phase differences, preferably maximum differences, relating to the grain distribution, it being known that the object contacted by the transducer is acoustically equivalent to water. On the other hand, in order to ensure suitable sensitivity, the material of the random phase screen preferably has an acoustic impedance in the vicinity of that of water.

The method in accordance with the invention is characterized in that the envelopes of the echographic lines recorded for the various positions of the random phase screen are summed so as determine the specular reflection zones therefrom. The maximum values of these envelopes, relating to the specular reflections, are always situated at the same areas, whilst the maximum values relating to the multi diffusers are shifted at random, so that the summing of the envelopes for a large number of recordings (for example 100) substantially increases the maximum values due to the specular reflections and hence the localization of organ walls, material faults or other specular walls becomes extremely exact. In this sense the invention represents a novel type of echographic imaging with reduced echographic "speckle" in comparison with the state of the art.

In the field of non-destructive materials testing, a delamination can thus be distinguished from a substantial porosity.

Actually, after the marking of the fault in the conventional manner, the summing of the envelopes of the echographic lines recorded for the different positions of the random phase screen increases the maximum values for a delamination (specular reflector); this is not the case when the fault is formed by a substantial porosity (numerous small diffusers).

Another advantage of the proposed ultrasonic echograph and method concerns the determination of the attenuation parameter $\beta$ of the object scanned, which is defined by $\alpha(F)=\beta F$, where $\alpha(F)$ is the attenuation and $\beta$ is the slope of the attenuation as a function of the frequency. It is known that the parameter $\beta$ is evaluated on the basis of the mean spectral power $\overline{A^2_z(F)}$ which provides, for a given scanning depth z, the amplitude of the echographic signal as a function of the ultrasonic frequency F. When the central frequency $\overline{F}(z)$ of $\overline{A^2_z(F)}$ is known for the depth z, $\beta$ can be experimentally deduced from the variations of $\overline{F}(z)$ with z by utilizing the following relation (see French patent specification No. 2 514 910):

$$\frac{d\overline{F}(z)}{dz} = -2\beta\sigma^2(z)$$

where $\sigma(z)$ is the spectral width of $\overline{A^2_z(F)}$ for the depth z. In practice, $\sigma(z)$ varies only little with z. Therefore, $\beta$ is linked to the slope of $\overline{F}(z)$ as a function of z.

This method of measuring the parameter $\beta$ necessitates the recording of a sufficiently large number of echographic lines. This requirement is satisfied in accordance with the invention in that the echographic lines recorded for the various positions of the random phase screen are cumulatively analysed through an analysis window which is displaced along said echographic lines in order to extract therefrom the attenuation parameter $\beta$ of the object scanned as a function of the central frequency $\overline{F}(z)$ and the spectral with $\sigma(z)$ of the mean spectral power $\overline{A^2_z(F)}$ which provides the amplitude of the echographic signal within said analysis window for a given exploration depth z. The analysis window isolates, around the point t (equivalent to a depth z=ct/2), a time zone having a width $\Delta t$ of the echographic line e(t) and corresponding to a thickness $\Delta z=c\Delta t/2$, where c is the speed of the ultrasonic wave.

The random phase screen thus enables multiplication of the measurement points and essentially means that for each of its positions the multi diffusers are fictitiously shifted in a random manner with respect to one another. Thus, it is no longer necessary to displace the piezoelectric transducer itself, this offers the advantage of improved spatial resolution for the measurement of the mean spectral power.

Moreover, because the exact position of the specular reflection zones along the echographic line is thus known, it is comparatively simple to eliminate their parasitic effect on the determination of the quantities $\overline{F}(z)$ and $\sigma(z)$. Therefore, the analysis window is displaced along said echographic lines while avoiding the specular reflection zones.

In a specific version of the method in accordance with the invention, the elementary spectral powers $A^2_z(F)$ of the echographic lines e(t) are calculated for each position of the random phase screen by Fourier transformation, followed by summing within said analysis window in all positions of the random phase screen in order to obtain the mean spectral power $\overline{A^2_z(F)}$.

In a simpler version, the central frequency $\overline{F}(z)$ of the spectra of the echographic lines is determined by the mean value, for a given position of the analysis window, of the number of zero crossings accumulated for all positions of the random phase screen, the spectral width $\sigma(z)$ being measured on the basis of echoes from a plane reflector for the transmitted ultrasonic signal, said echoes being accumulated for all positions of the random phase screen. This atractive arrangement takes into account the fact that $\sigma(z)$ is substantially independent of z and that the number of zero crossings is proportional to the central frequency $\overline{F}(z)$ (see the article "Attenuation estimation with the zero-crossing technic phantom studies", Ultrasonic Imaging, Vol. 7, pp. 122-132 (1985)).

In another version, the echographic lines are filtered by means of a narrow band-pass filter which is centered around the frequency F and, for this frequency F, the sum of said envelopes is subjected to a logarithmic conversion in order to derive therefrom the attenuation $\alpha(F)$ which is divided by the frequency F in order to obtain the attenuation parameter in accordance with the relation $\alpha(F)=\beta F$. It is known that in this case the envelope thus calculated is exp $(-\alpha(F)ct/2)$.

The following description, given by way of non limitative examples, with reference to the attached drawings will offer a better understanding of the invention and how it can be carried out.

Figure 1:
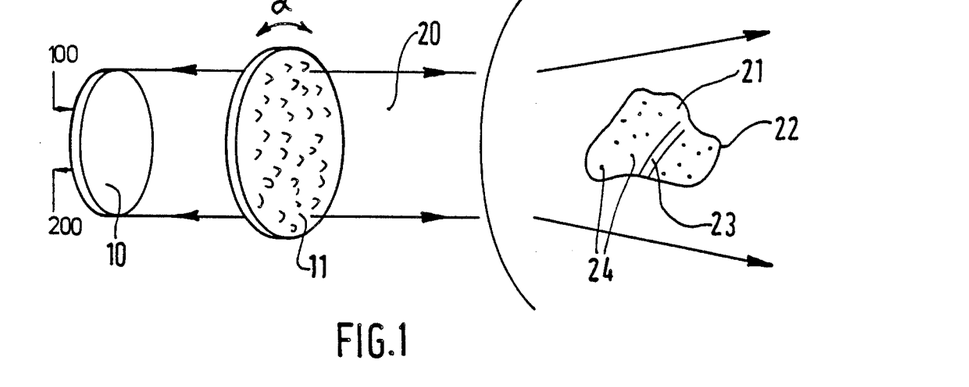
FIG. 1 is a perspective view of the principle of the transducer section of an ultrasonic echograph in accordance with the invention.

FIG. 1 is a perspective view illustrating the principle of the transducer section of an ultrasonic echograph for the scanning of an object (organ or material) 21 which consists of a wall 22, specular reflectors 23 such as a vein or a fault, and multi diffusers 24 which are distributed within the object 21. The echograph in accordance with the invention comprises a piezoelectric transducer 10 for the transmission and reception of an ultrasonic scanning beam 20. As is shown in detail in the FIGS. 4 and 5, the piezoelectric transducer is connected to a transmitter stage 100 and a receiver stage 200 for the ultrasonic signals. As appears from FIG. 1, with the piezoelectric transducer 10, being stationary in this case, there is associated a random phase screen 11 which is arranged in and is displaceable, in this case rotatable, with respect to the axis of an ultrasonic scanning beam 20. In the case shown in FIG. 1, the random phase screen 11 can be rotated about its axis, each of its positions (for example, 100 positions) enclosing an angle α; for each of the positions of the random phase screen an echographic line is recorded. Generally speaking, the random phase screen 11 is constructed as a plate of a material whose sound propagation speed differs from that of water and at least one surface of which has a random granulated roughness. From the materials which can be used in this respect, preferably these materials are chosen whose acoustic impedance approximates that of water in order to ensure suitable sensitivity. Suitable materials in this respect are rubbers which have a speed of sound which is lower than that of water but a greater density. However, they are not very rigid and introduce substantial signal attenuation. Given materials are more rigid and introduce less attenuation, notably those materials which are commercially known as TPX and which have a sound propagation speed which is higher than that of water and a density which is lower. As far as the granulation of the material is concerned, the sized of the grains should preferably be such that the coherence length exceeds the wavelength of the acoustic wave or some tens of millimeters. The thickness of the grains it should be sufficient to allow for phase differences amounting to $\pi$.

Thus, the essential advantage of the invention consists in the multiplication of the measurement points decorrelated by a factor equal to the number of positions of the random phase screen 11, without it being necessary to displace the piezoelectric transducer 10 and hence without loss of spatial resolution.

Figure 2A:
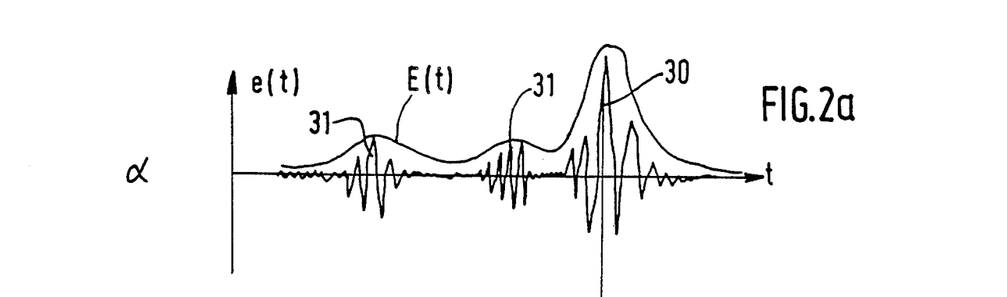
FIGS. 2a, 2b and 2c illlustrate how the position of the specular reflection zones can be extracted from the echographic lines be means of the echograph in accordance with the invention.
Figures 2B, 2C:
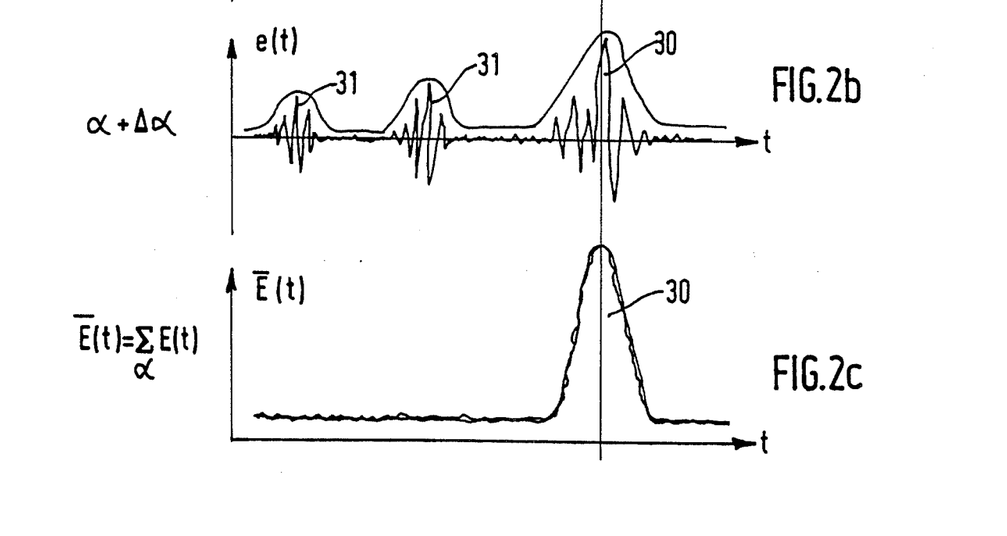

The FIGS. 2a, 2b and 2c illustrate how an analysis of the envelope of the echographic lines obtained by means of the apparatus in accordance with the invention enables very exact determination of the image of the object 21 of FIG. 1 both as regards its wall 22 and its specular reflectors (internal walls) 23. FIG. 2a shows an echographic line e(t) recorded for a given position α of the random phase screen. This echographic line comprises the echoes 31 which are caused by the multi-diffusers 24 and the echoes 30 which are caused by the specular reflections from the obstacles of the type of the walls 22 and 23. The envelope E(t) of the echographic line e(t) thus contains maximum values, some of which relate to the multi-diffusers and whose amplitude is so high that it disturbs the localization of the specular reflection zones 30. At this stage, the analysis of the envelope would imply in a given lack of exactness in the echographic image of the object 21 being scanned. FIG. 2b shows the recording of the echographic line e(t) for another position α+Δα of the random phase screen 11, Δα being, for example, the rotary step of said random phase screen. This echographic line has a structure which is analogous to that of FIG. 2a, be it that the maximum values of the envelope E(t) relating to the multi-diffusers are not situated at the same distances along the echographic line; however, the maximum values of E(t) which relate to the specular reflections appear in the same positions. Consequently, as appears from FIG. 2c, if all envelopes E(t) of the echographic lines recorded for all positions α of the random phase screen are summed, the maximum values relating to the specular reflections are linearly added, whilst the maximum values relating to the multi-diffusers are only squarelaw added because of the random nature of their distribution. For the 100 distinct positions of the random phase screen the precision of the determination of the specular reflection zones 30 is thus increased by $\sqrt{100} = 10$, which is a considerable improvement resulting in an exceptionally good quality of the images of organs.

FIGS. 3a, 3b, 3c and 3d illustrate how the attenuation parameter $\beta$ can be determined from the recording of the echographic lines e(t) in the case of an analysis by Fourier transformation.

Figure 3A:
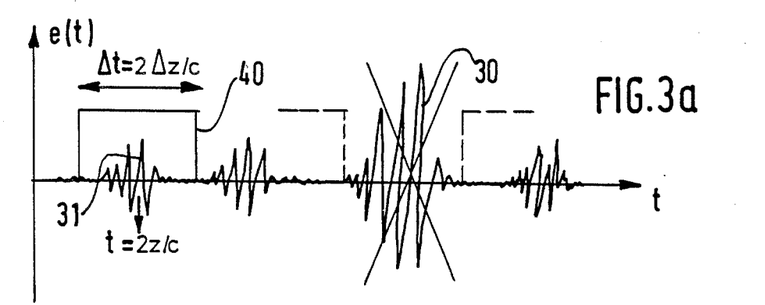
FIGS. 3a, 3b, 3c and 3d illustrate how the attenuation parameter $\beta$ can be reduced from the echographic lines by means of the echograph in accordance with the invention.

As appears from FIG. 3a, the echographic lines e(t) recorded from each position α of the random phase screen 11 are cumulatively analysed through an analysis window 40 which is displaced along the echographic lines e(t). The analysis window 40 defines a time zone having a width Δt which corresponds to a tissue thickness Δz=cΔt/2. The determination of the attenuation parameter $\beta$ is based on the analysis of the echoes 31 emitted by the multi diffusers 24 distributed in the object 21 scanned. In this sense the specular reflection zones 30 correspond to parasitic signals. The processing described with reference to the FIGS. 2a, 2b and 2c enables elimination of the adverse effects of the specular reflection zones. Actually, because these specular reflection zones 30 are perfectly localized in the echographic lines, it suffices, as appears from FIG. 3a, to displace the analysis window 40 along the echographic lines while avoiding the known specular reflection zones.

Figure 3B:
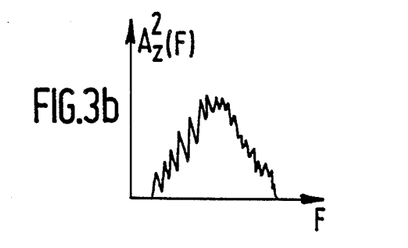
Figure 3C:
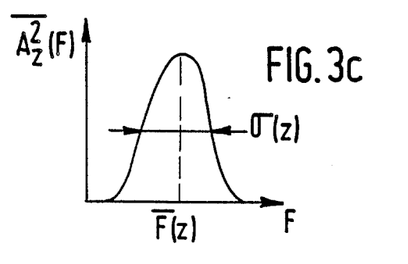

For a given position of the analysis window 40 along the echographic line e(t), which position is characterized by the time t, that is to say also by the depth z=ct/2, and for a given position α of the random phase screen 11, the corresponding spectral power $A^2_z(F)$ is calculated, in the case shown in FIG. 3b, by Fourier transformation. This power itself generally is of a mediocre quality and difficult to use for an exact determination of the attenuation parameter $\beta$, because it contains numerous irregularities due to the presence of several echoes from diffusers in the analysis window. However, it is an essential advantage of the invention that, when the elementary spectral powers $A^2_z(F)$ calculated for all positions of the random phase screen are summed within the same analysis window 40, the smooth mean spectral power $\overline{A^2_z(F)}$ (FIG. 3c) of higher quality is obtained, enabling notably the exact determination, for each depth z, of the central frequency $\overline{F}(z)$ and the spectral width $\sigma(z)$ of the mean spectral power $\overline{A^2_z(F)}$. It is to be noted that this improvement is obtained without displacement of the piezoelectric transducer 10, that is to say without deterioration of the spatial resolution.

Figure 3D:
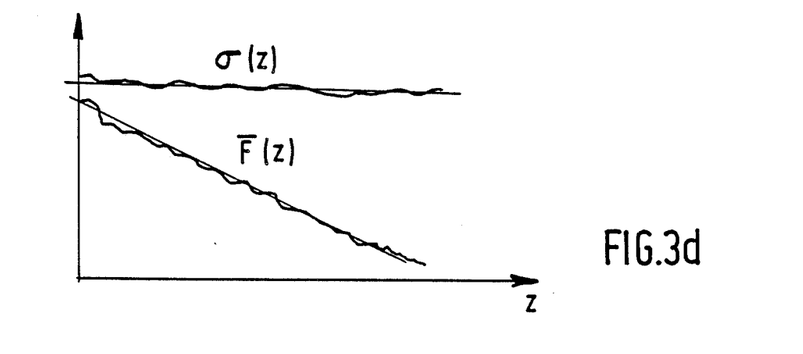

The variations of $\overline{F}(z)$ and $\sigma(z)$ as a function of z (FIG. 3d) being known, the desired attenuation parameter $\beta$ is derived therefrom by means of the relation:

$$\frac{d\overline{F}(z)}{dz} = -2\beta\sigma^2(z)$$

Another method of calculating $\overline{F}(z)$ and $\sigma(z)$ without utilizing the Fourier transformation technique, which is always cumbersome to execute, consists in the determination of the central frequency $\overline{F}(z)$ on the basis of the mean value, taken over all positions α of the random phase screen, of the number of zero crossings of the echographic lines within the analysis window 40 centered around t (or z=ct/2). It is known that the number of zero crossings is proportional to the central frequency $\overline{F}(z)$. Regarding the spectral width $\sigma(z)$, benefit can be derived from the fact that it hardly varies as a function of the depth z and can be calculated once on the basis of the recording of the echoes from a reflector surface for the transmitted ultrasonic signal, which echoes are cumulated in all positions α of the random phase screen 11.

Moreover, for all relevant embodiments the diffraction effects can be taken into account by means of a method which is described in French patent specification No. 2 544 238 (PHF 83.589) and which essentially consist of the recording in advance of the mean diffraction curve $\overline{D^2_z(F)}$ of the piezoelectric transducer comprising said random phase screen 11 for each scanning depth z and summed for all positions α of the random phase screen 11.

Figure 4:
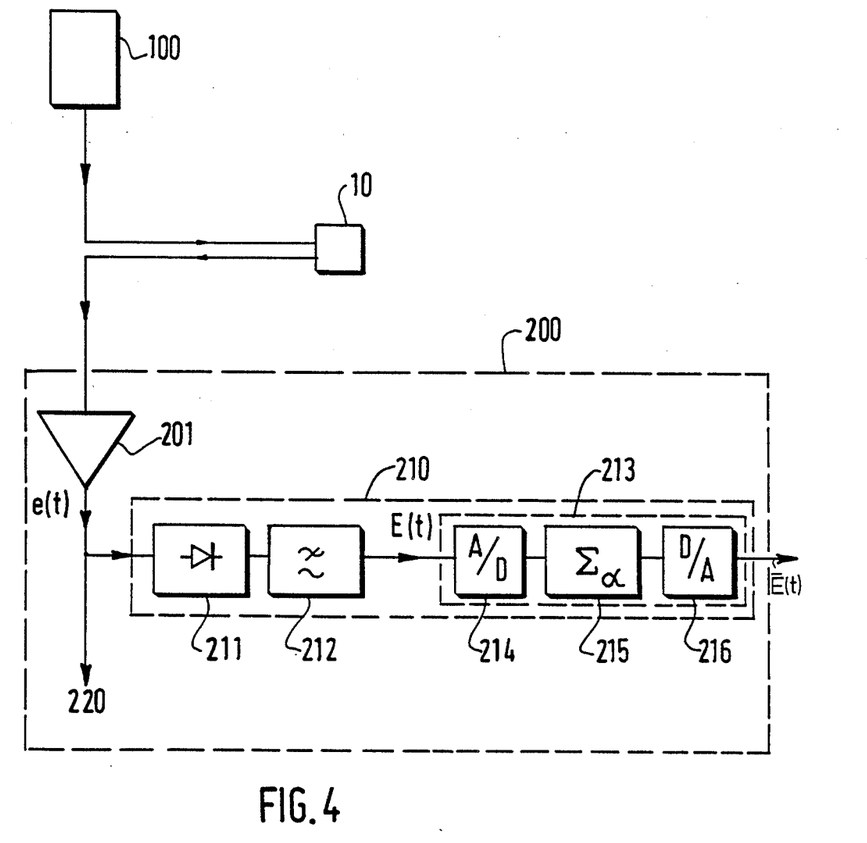
FIG. 4 shows a diagram of the section of an echograph in accordance with the invention which serves to detect the envelopes of the echographic lines.

FIG. 4 diagrammatically shows the section of an ultrasonic echograph in accordance with the invention which serves for the detection of the mean envelope $\overline{E}(t)$ of the echographic lines e(t). As appears from FIG. 4, the transducer 10 is connected on the one hand to a transmitter stage 100 which essentially comprises, in a conventional manner, an electric excitation signal generator and, on the other hand, to a receiver stage 200 which comprises, connected to its input, an RF amplifier 201 which includes gain compensation as a function of the depth. The amplifier 201 is followed by two parallel processing channels, one of which is connected to a stage 210 for the detection of envelopes, the other channel being connected to a stage 220 for measuring the attenuation parameter β. The stage 210 for the detection of the envelopes comprises a rectifier 211 which is connected to a low pass filter 212. The signal thus rectified and filtered corresponds to the envelope E(t) of the echographic lines e(t) for one position of the random phase screen. In order to obtain $\overline{E}(t)$, resulting from the cumulation of the measurements for all positions of the random phase screen, the envelope signal E(t) supplied by the low pass filter 212 is summed by an adder 213 which comprises an A/D converter 214, and a digital memory 215 in which the digital signals supplied by the converter 214 are added. Finally, the envelope $\overline{E}(t)$ obtained in digital form is converted into an analog signal by means of the D/A converter 216.

Figure 5A:
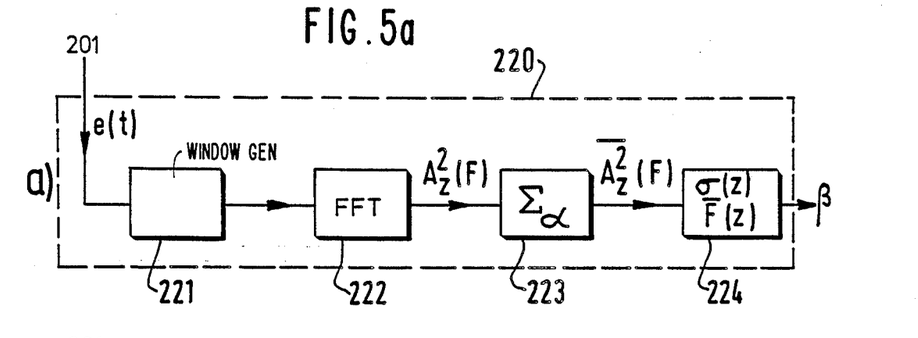
FIGS. 5a, 5b show the diagram of two embodiments of the section of an echograph in accordance with the invention which serves for determining the attenuation parameter.

FIG. 5a shows a version of the section 220 of the ultrasonic echograph shown in FIG. 4, which section serves to determine the attenuation parameter β. The echographic lines e(t) are analysed, for each position of the random phase screen, within a sliding window 40 supplied by a window generator 221. The elementary spectral powers $A^2_z(F)$ are subsequently calculated by a fast Fourier transformation stage 222. Subsequently, the elementary spectral powers $A^2_z(F)$ are summed for all positions α of the random phase screen by an adder 223 which is analogous to the adder 215 shown in FIG. 4. The processing unit 224 then calculates the parameters σ(z) and $\overline{F}(z)$ of the mean spectral power $\overline{A^2_z(F)}$ obtained on the output of the adder 223, enabling ultimately β to be derived from the variations of σ(t) and F(z) as a function of z.

Figure 5B:
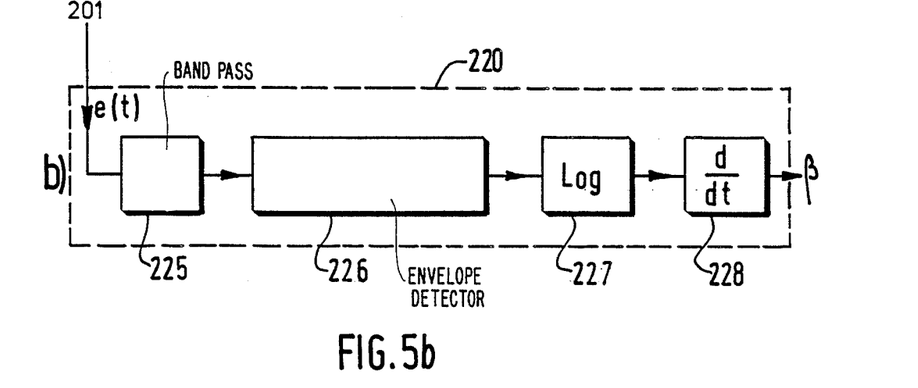

In 5b, the echographic signal supplied by the amplifier 201 is filtered at the frequency F by a narrow pass-band filter 225 which is centered around F. The mean envelope of this filtered signal is calculated by means of an envelope detector 226 of the type described with reference to FIG. 4. The mean envelope thus obtained is a descending exponential curve exp $(-\alpha(F).ct/2)$, where α(F) is the attenuation for a frequency F. The logarithmic amplifier 227 transforms this exponential curve into a straight line having a slope $-\alpha(F)c/2$. By measurement of this slope by means of the differentiation stage 228, the attenuation α(F) is obtained. By changing the central frequency F of the band-pass filter 225, the variations of α(F) as a function of F can be studied and β can be deduced therefrom as $\beta = \alpha(F)/F$.

Figure 6:
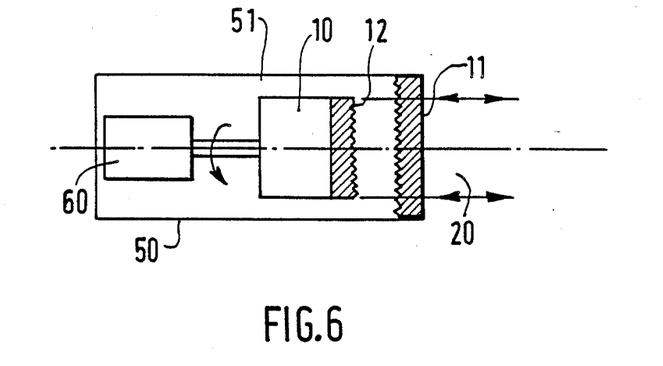
FIGS. 6 and 7 are cross sectional views of two embodiments of an echograph in accordance with the invention.

FIG. 6 is a cross sectional view of a particular embodiment of an apparatus in accordance with the invention in which the piezoelectric transducer 10 is associated with two random phase screens 11, 12. More specifically, the first random phase screen 11 which is stationary forms the window of a container 50 which is filled with a liquid 51 for acoustic adaptation and which encloses the piezoelectric transducer 10 which itself is provided with a second random phase screen 12. The piezoelectric transducer 10 and the random phase screen 12 are rotated about their axes by means of a motor 60. The advantage of the presence of two random phase screens which are movable with respect to another consists in the reduction of the angle of rotation required for obtaining decorrelated echographic lines, thus enabling the use of much smaller displacement steps of the mobile random phase screen, so that the number of decorrelated measuring points can be further increased. Another possibility is the use of a stationary transducer 10, rotating the phase screen 12 separately of the transducer, and keeping the phase screen 11 always stationary.

Figure 7:
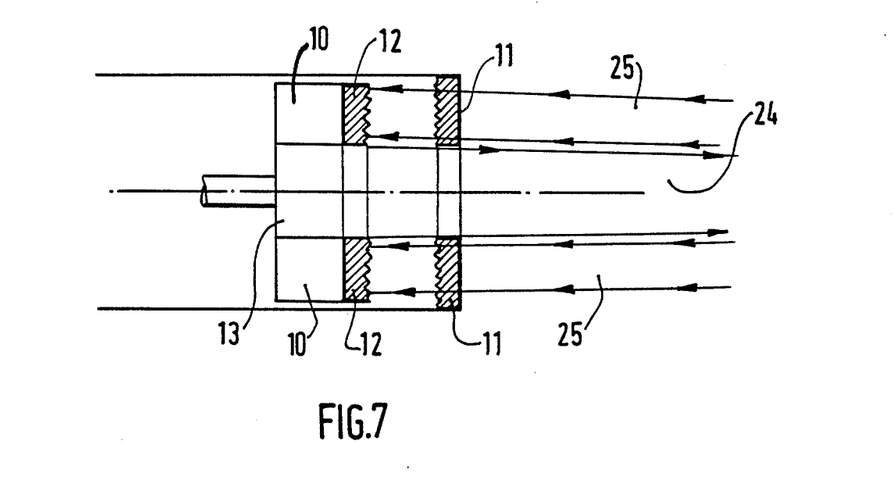

Contrary to the example of in FIG. 6, showing a piezoelectric transducer 10 providing the transmission as well as the reception of the ultrasonic beam 20, the apparatus shown in FIG. 7 comprises two piezoelectric transducers 13, 10, the transducer 13 providing the transmission of the incident part 24 of the ultrasonic beam 20, whilst the transducer 10 serves to receive the reflected part 25 of said ultrasonic beam 20. In order to prevent deterioration of the incident beam 24 due to the presence of a random phase screen arranged in its path, only said second piezoelectric transducer 10 is associated with a random phase screen 11 which is displaceable in the reflected part 25 of the ultrasonic beam. As appears from FIG. 7, a second random phase screen 12 which is stationary with respect to the reflected beam 25 can also be associated with the piezoelectric transducer 10. In the embodiment shown in the Figure, the piezoelectric transducer 10 and the random phase screens 11 and 12 have an annular shape. The same principle can also be used for random phase screens which are arranged only in front of the transducer 13 instead of the transducer 10.

Moreover, the transducers 13 and 10 may be either flat transducers or focussed transducers in the form of a spherical dome.

What is claimed is:

1. An ultrasonic echograph comprising a first transducer for transmitting and/or receiving an ultrasonic beam, first random phase screen means, disposed in the ultrasonic beam and displaceable to a plurality of relative positions with respect to th transducer and the beam, for shifting the phase of said beam randomly in the range between at least 0 and π as a function of said relative positions, means for receiving echographic lines produced from reception of the beam at each of said plurality of positions and second phase screen means which are disposed in and are stationary with respect to the ultrasonic beam.

2. An echograph as claimed in claim 1, further comprising a container filled with an acoustic adaptation liquid and a motor which rotates the transducer and the second screen means with respect to the container, and wherein the first screen means forms a window in the container.

3. A method for scanning an object by ultrasonic echographing comprising the steps of:
- transmitting an ultrasonic beam at an object;
- receiving the ultrasonic beam after it interacts with the object;
- sequentially introducing a plurality of random phase shifts in the range between 0 and $\pi$ into said beam by a moving random phase screen which is disposed in said beam to each of a plurality of relative positions with respect to the beam, and recording echographic lines produced produced from said received beam at each of the plurality of positions of said screen wherein a transducer is used for transmitting and/or receiving the beam and further comprising the step of prerecording the mean diffraction curve of the transducer, using the phase screen, for each scanning depth by summing diffraction curves for all of the plurality of positions of the phase screen.

* * * * *